United States Patent [19]

Paap et al.

[11] Patent Number: 4,524,272
[45] Date of Patent: Jun. 18, 1985

[54] BEHIND CASING WATER FLOW DETECTOR

[75] Inventors: Hans J. Paap, Bellaire; Harry D. Smith, Jr., Houston, both of Tex.

[73] Assignee: Texaco Inc., White Plains, N.Y.

[21] Appl. No.: 451,635

[22] Filed: Dec. 20, 1982

[51] Int. Cl.³ .............................................. G01V 5/00
[52] U.S. Cl. .................................. 250/265; 250/266; 250/270
[58] Field of Search ............... 250/256, 265, 266, 269, 250/270; 376/159, 160, 161

[56] References Cited

U.S. PATENT DOCUMENTS

| 4,028,546 | 6/1977 | Peelman et al. | 250/270 |
| 4,032,778 | 6/1977 | Paap et al. | 250/270 |
| 4,032,780 | 6/1977 | Paap et al. | 250/270 |
| 4,035,640 | 7/1977 | Arnold et al. | 250/270 |
| 4,071,757 | 1/1978 | Arnold et al. | 250/270 |

Primary Examiner—Janice A. Howell
Attorney, Agent, or Firm—Robert A. Kulason; Ronald G. Gillespie

[57] ABSTRACT

A method for measuring the location, linear flow rate, and volume flow rate of undesired water flow behind well casing in a well includes irradiating borehole environs with high energy neutrons from a neutron source located in a well tool in the borehole. Gamma rays from the decay of an unstable isotope which comprises a portion of any undesired behind casing flow present are detected with gamma ray detectors located in the well logging tool. Count signals representative of the detected gamma rays from at least one of the detectors are separated into at least three energy dependent signals. A ratio signal corresponding to the ratio of at least two of the three energy dependent signals is generated and an indication of the linear flow rate of the undesired behind casing water flow in a preferred direction is determined from the count signals from the detectors and from the first predetermined relationship. An indication of the volume flow rate of the water flow is generated from said ratio signal, the energy dependent signal not used in a generation of the ratio signal and the linear flow indication from a second predetermined relationship.

20 Claims, 6 Drawing Figures

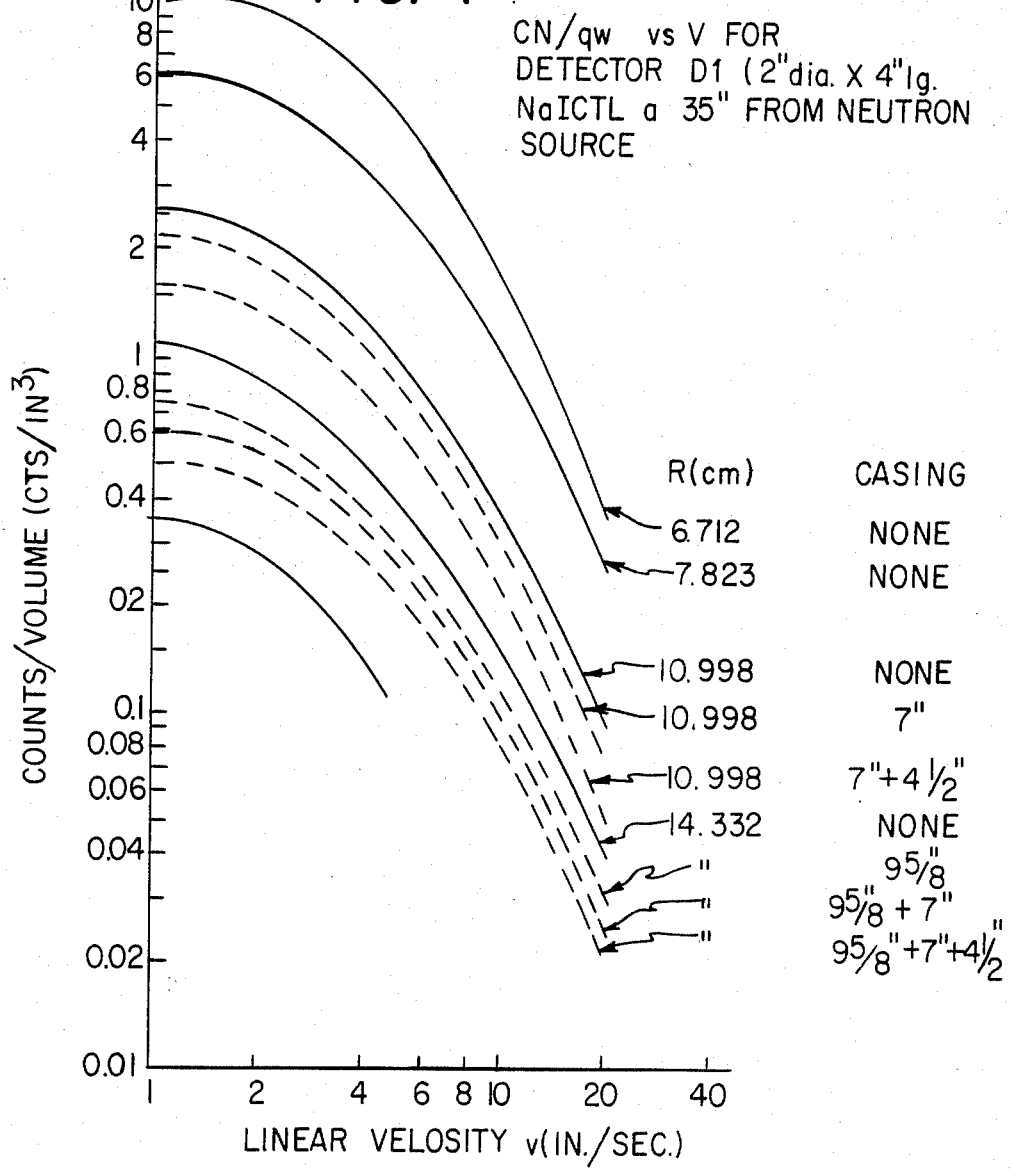

FIG. 2A    FIG. 2B    FIG. 2C
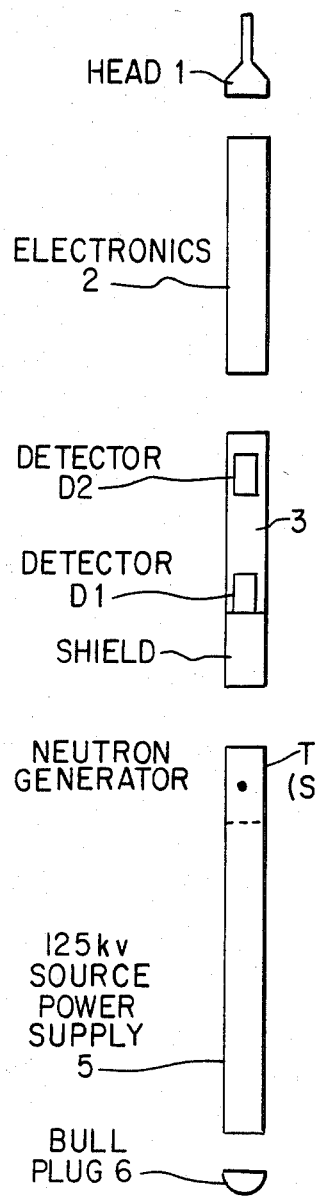
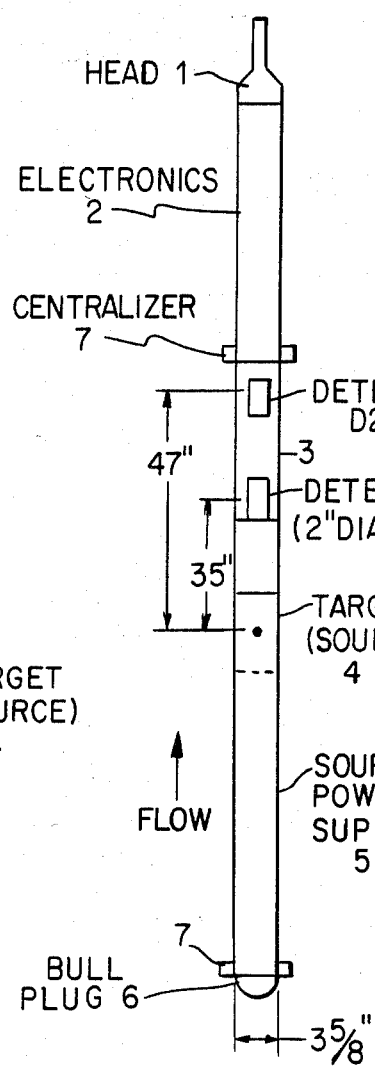
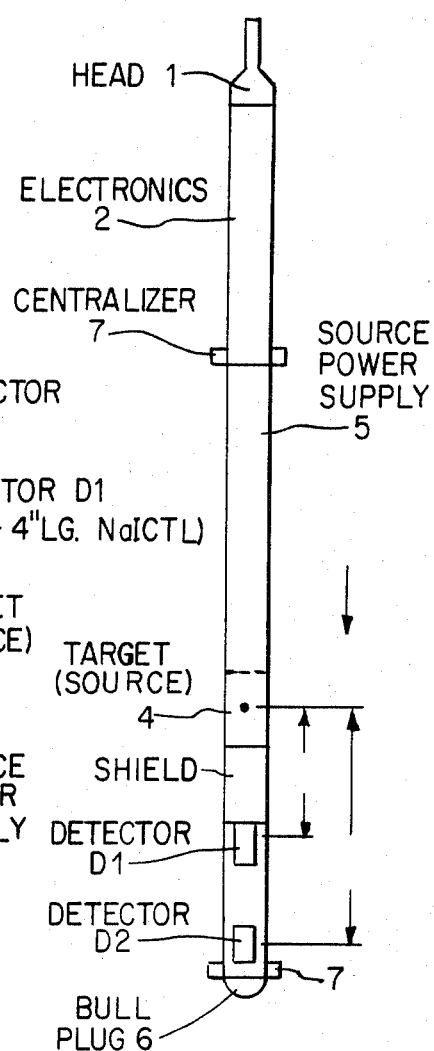
FIG. 4
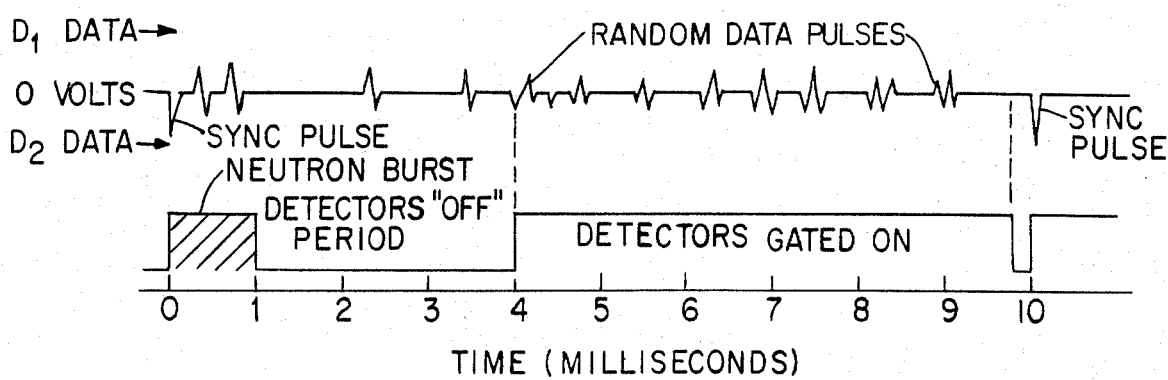

BEHIND CASING WATER FLOW DETECTOR

BACKGROUND OF THE INVENTION

Field of the Invention

The present invention relates to well logging methods in general and, more particularly, to radioactive well logging methods.

SUMMARY OF THE INVENTION

A method for measuring the location, linear flow rate, and volume flow rate of undesired water behind well casing in a well borehole includes irradiating a borehole environs with high energy neutrons from a neutron source in a well logging tool in the borehole. Detecting gamma rays resulting from the decay of an unstable isotope comprising a portion of any undesired behind casing water flow with at least two gamma ray detectors in the well logging tool and spatially arranged with the neutron source and each other in a predetermined manner. The count signal from at least one detector is separated into at least three energy dependent signals related to the energy of the gamma rays causing said signals and a ratio signal is generated representative of at least two of the energy dependent signals. The count signals from the detectors are utilized in a predetermined manner to derive an indication of the linear flow rate of undesired behind casing water flow in a preferred direction. An indication of the volume flow rate of the undesired behind casing water flow is derived from the ratio signal, the energy dependent signal not used in the generation of the ratio signal and the linear flow indication according to a second predetermined relationship.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

BRIEF DESCRIPTION OF THE DRAWINGS

FIG. 1 is a graphical representation showing the net counts CN per cubic inch of flowing water as a function of linear velocity for different borehole conditions.

FIGS. 2A, 2B and 2C are schematic representations of the downhole portion of a modular water flow detection sonde according to the present invention.

FIG. 4 is a schematic diagram illustrating the timing and data transmission format of the water flow detection system of the present invention.

DESCRIPTION OF THE INVENTION

Figure 3:
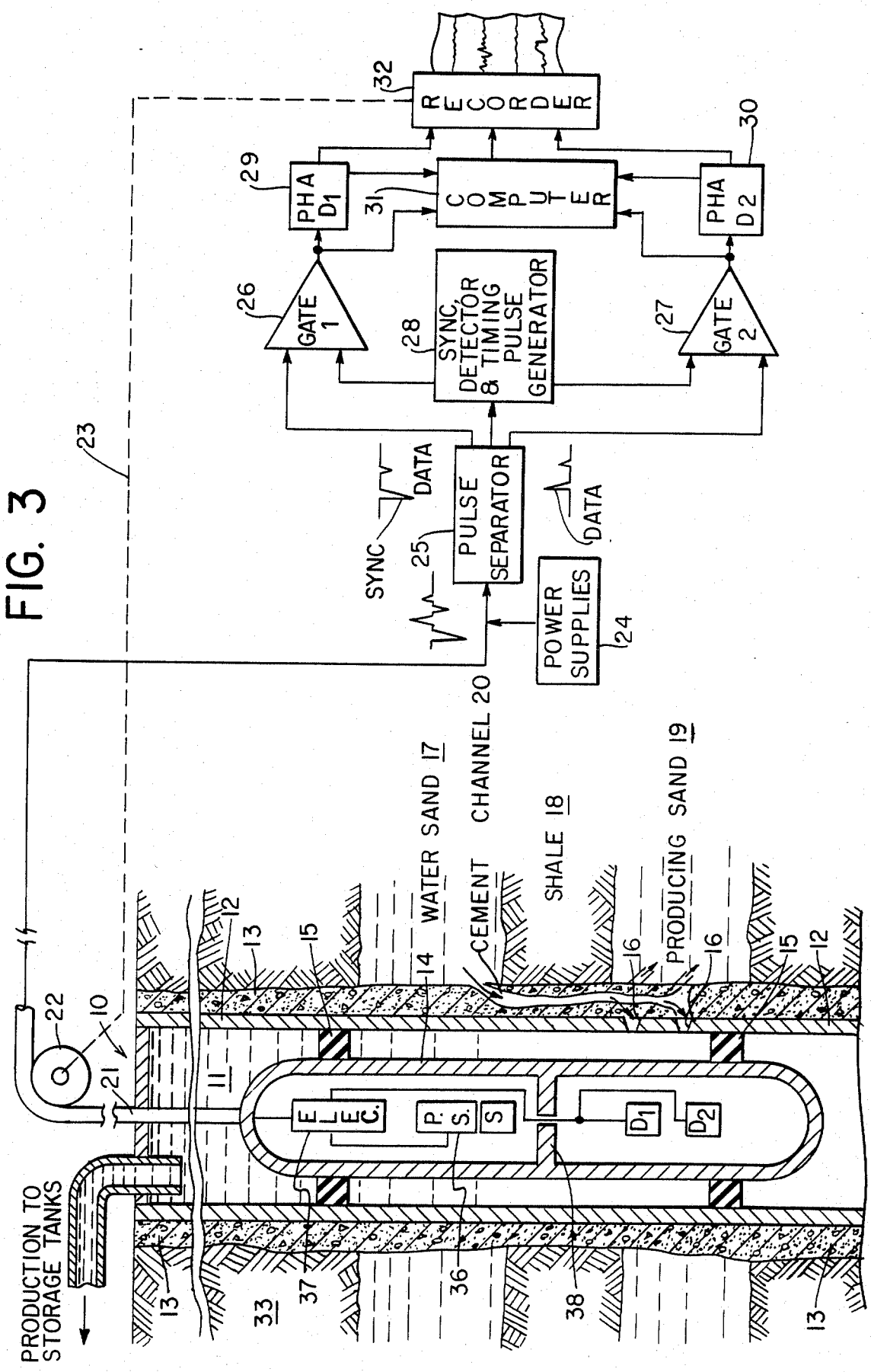
FIG. 3 is a schematic representation of a water flow detection system in a cased well bore according to the present invention.

Before considering a detailed description of hardware systems employed to measure the volume flow rate of water behind the casing according to the concepts of the present invention, it will be helpful to consider the theoretical basis for the measurement according to the principles of the invention.

The techniques of a Behind Casing Water Flow Monitor, as described and disclosed in U.S. Pat. Nos. 4,032,778; 4,032,780 and 4,035,640, and of the present invention are predicated upon the creation of the unstable radioactive isotope nitrogen 16 in the stream of water flowing behind the casing which is to be detected. This is accomplished by bombarding the flowing water with high energy neutrons having an energy in excess of approximately 10 MeV. This bombardment causes nuclear interactions to produce the unstable nitrogen isotope 16 from the oxygen nuclei comprising the water molecules in the flow stream, the nuclear reaction being $O^{16}$ (n,p) $N^{16}$.

The Behind Casing Water Flow Monitor (BCWF) of the aforementioned patents determines the linear velocity of the water flowing in or behind the casing from the ratio of the count rates of detector 1 to those of detector 2. From those patents, knowing the cross-sectional area of the water flow, the volume flow rate can easily be computed. For behind casing flow, the cross-sectional area of the water flow is unknown and virtually impossible to measure. It was therefore necessary to relate the linear flow velocity and one detector count rate to the volume flow rate using some other parameter which also can be measured with acceptable accuracy by the monitor. In the aforementioned patents, such a parameter was found to be the radial distance of the flow from the monitor. The technique to determine this distance is based on the increasing energy degradation occurring in the gamma ray spectrum when the gamma rays travel through increasing thicknesses of material such as water, casing and/or cement. The energy degradation is caused by inelastic collisions of the gamma rays with matter.

The present invention determines the water's volume flow rate directly and without knowledge of the casing size and weight, cement, annulus etc.

It has been experimentally determined that the water volume flow rate $q_w$ can be related to the net detector count rate $C_N$ and the linear water velocity V by the following general relationship.

$$\ln[C_N/q_w] = a_0 + a_1 \ln v + a_2 (\ln v)^2 \tag{1}$$

Where $C_N$ is obtained by integrating the detected gamma energy spectrum above an energy to substantially exclude gamma rays from activated nuclei other than those from nitrogen 16. Further, it was found that the terms $a_1$ and $a_2$ are constants and independent of distance and materials such as casings and cement etc. between logging tool and water flow. The term $a_0$, however, was found to be a linear function of the gamma energy spectral degradation as represented by the count rate ratio $C^H/C^L$ as follows.

$$a_0 = b_0 + b_1(C^H/C^L) \tag{2}$$

where $b_0$ and $b_1$ are constants and where $C^H$ is obtained by integrating the detector gamma energy spectrum over an energy region which substantially includes the primary gamma energy peaks of 7.12 and 6.13 MeV from nitrogen 16 decay and their respective 1st and 2nd escape peaks. $C^L$ is obtained by integrating the same spectrum over an energy range substantially including the nitrogen 16 gamma ray energies which have been degraded in energy primarily through, Compton Scattering, that is through collisions with electrons within the matter traversed by the gamma rays. The ratio $C^H/C^L$ is therefore a function of the number of electrons encountered by the gamma rays in their travel through a thickness of material. The number of electrons is shown by the proportionality $$N_e \alpha \sum_{i=1}^{n} \{p_i d_i (z_i/M_i)\} i = 1, 2 \ldots n \quad (3)$$

where $p_i$, $d_i$, and $z_i$ and $M_i$ are density, the thickness the number of electrons per molecule and the molecular weight, respectively, of the ith component of the material between tool and water flow. Gamma ray attenuation within the considered gamma energy range is primarily due to Compton Scattering. Therefore the term $a_0$ of equation (1) represents the attenuation of the gamma count rate $C_N$ with the amount and type of material between tool and water flow, whereas the terms $a_1$ and $a_2$ determine the velocity dependence.

For a well logging tool configuration as shown in FIGS. 2A, 2B, 2C and described hereafter in detail, FIG. 1 presents a plot of Detector D1 counts per unit water volume $C_N/q_w$ versus linear velocity for various combinations of distances and casings between the logging sonde and the water flow. $C_N$ was obtained by integrating the gamma ray spectrum over the energy range 3.25 to 7.2 MeV. The constants $a_1$ and $a_2$ in equation (1) were evaluated for the data in FIG. 1 to 0.0494 and −0.3832, respectively. The constants $b_0$ and $b_1$ in equation (2) were found to be −8.535 and 2.146, respectively, when the gamma ray spectrum was integrated over the energy region 4.9 to 7.2 MeV to obtain $C^H$ and over the region 3.24 to 4.0 MeV to obtain $C^L$.

The equipment used to make the water flow measurements described and disclosed in the aforementioned U.S. patents relies on the activation of the oxygen 16 nuclei by the capture of neutrons with energy equal to or greater than 10 MeV. This necessitates the use of a neutron generator which can generate a sufficient intensity of neutrons having an energy of greater than 10 MeV to perform the measurement. The most commonly available such neutron generators are those relying on the deuterium-tritium reaction to generate this flux of high energy neutrons at a sufficient intensity to perform measurements of this type. The deuterium-tritium reaction neutron generators are generally referred to as accelerator type neutron sources.

Accelerator type neutron sources generally comprise an evacuated envelope having a target material at one end thereof which is impregnated with a high percentage of tritium. This target is kept at a high negative potential (approximately 125 KV) with respect to the source of deuterium nuclei which are to be accelerated onto it. At the opposite end of the evacuated container is an ion source and a source of deuterium nuclei usually termed replenisher. In operation, such accelerator sources generate a concentration of deuterium ions from the ion source which are focused by electrostatic lenses into a beam and accelerated by the high negative potential onto the target material which is impregnated with the tritium nuclei. Due to the high acceleration voltage, the electrostatic Coulomb repulsion between the deuterium nuclei and the tritium nuclei is overcome and the thermo-nuclear fusion reaction takes place generating a relatively high intensity of neutrons having an energy of approximately 14 MeV.

In constructing the equipment to perform the water flow measurements previously discussed, since it is necessary to use an accelerator type neutron source, a problem arises in the physical construction of the downhole portion of the system. This problem is caused by the fact that a high voltage power supply is necessary to generate the approximately 125 KV potential required by the neutron source for the acceleration of the deuterium ions. Perhaps the most efficient such high voltage power supply is a multiple stage Cockcroft-Walton Voltage Multiplier Circuit. A circuit arrangement for generating a high voltage such as that required by the accelerator tube when placed in a well logging instrument requires considerable longitudinal extent in order to stack the voltage multiplying stages longitudinally along the length of the well logging instrument while providing sufficient insulation about these voltage multiplying stages to prevent voltage breakdown of the insulators.

Referring now to FIGS. 2A, 2B and 2C the downhole sonde for the water flow detection measurement is illustrated schematically. The sonde is made up of several component sections which may be physically rearranged to perform steps in the detection of the water flow behind the casing according to the principles previously discussed. The upper end of the sonde is provided with a head member 1 approximately 10 inches in longitudinal extent. A control and detector electronics section 2 is attached to the head section and is approximately 75 inches in longitudinal extent. The detector section 3 houses two gamma ray detectors D1 and D2 which may comprise thalium activated sodium iodide crystal detector (2 inch by 4 inch cylinders in appearance) and an iron shielding member which is interposed on the end opposite the neutron generator. Below the detector section in FIG. 2A is a neutron generator and power supply section housing a neutron generator 4 and the 125 KV high voltage power supply 5. The spacings preferred between the neutron source and the centers of detectors D1 and D2 in the assembled instrument are, respectively, 35 inches and 47 inches as shown in FIGS. 2A–2C. The neutron source and power supply section is approximately 94 inches in length. Finally, at the lower end of the sonde is a protective bull plug assembly 6 which serves to protect the lower extremity of the sonde should it come into contact with the bottom of the borehole or some obstruction therein.

The problem which arises is due to the longitudinal extent (94 inches) of the high voltage power supply. It will be realized by those skilled in the art that in order to detect water flow in an upward direction that the flow must first pass the neutron source and then subsequently pass the detectors in its movement. This implied the configuration illustrated in FIG. 2B where the detector section 3 of the well logging instrument is placed above the high voltage power supply and neutron generator section 4 and 5. However, in order to detect water flow in a downward direction, the configuration illustrated in FIG. 2C is required wherein the downward water flow must first pass the neutron source and then pass the gamma ray detectors in order to make the flow measurement as previously described. In this configuration, the neutron source-power supply section 4, 5 must be placed above the detector section 3 on the downhole instrument.

Since the gamma ray detectors D1 and D2 must be located within a reasonable distance of the neutron generator target, the tritium impregnated target of neutron source 4 must be located as close as possible to the shield portion of the detector section 3 of the instrument. This requires the design of a neutron source 4 power supply 5 section which is reversible (i.e. connectable to operate from either end) when going from the configuration shown in FIG. 2B to that shown in FIG. 2C in order to detect water flow in an upward or a downward direction, respectively. Similarly, all of the component portions of the downhole instrument of FIGS. 2A, 2B and 2C are constructed in a modular fashion. These modules may be joined by screw type fluid tight assemblies and sealed against the incursion of borehole fluid by sealing means at each of these junctions.

The downhole sonde illustrated schematically in FIGS. 2A, 2B and 2C is also provided with centralizer members 7 which may comprise cylindrical rubber arms or the like which extend outwardly into touching engagement with the inside walls of the well casing when the sonde is lowered into the borehole for measuring purposes. These centralizer arms 7 maintain the body of the sonde in a central position within the casing in order to assist in preserving cylindrical symmetry of the measurements as required to determine volume water rate.

The electronics section 2 of the downhole sonde functions, as will be described in more detail subsequently, to control the operation of the neutron source 4 and to furnish high voltage power for the operation of the detectors which are contained in the detector section 3 of the sonde. The electronics section 2 also serves to provide synchronization (or sync) pulses at the beginning of each neutron burst. The electronics section 2 also contains circuit means to transmit electrical pulse signals from the detectors and sync pulse signals up to the well logging cable to the surface.

Referring now to FIG. 3, a well logging system in accordance with the concepts of the present invention is shown in a borehole environment with the surface equipment portion thereof and is illustrated schematically. A downhole sonde 14 which in practice is constructed in the modular manner illustrated with respect to FIGS. 2A, 2B and 2C, is suspended in a well borehole 10 by an armored well logging cable 21 and is centralized by centralizers 15 as previously described with respect to the interior of the well casing 12. The cased borehole is filled with a well fluid 11. The downhole sonde of FIG. 4 is provided with dual gamma ray detectors 34 and 35 which are shown mounted in the configuration shown in FIG. 2C for detecting water flow in a downward direction behind the casing 12. The downhole sonde is also provided with a 125 KV power supply and neutron generator 36 of the type previously described. The electronics section 37 of the downhole instrument 14 corresponds to electronics section 2 of FIGS. 2A, 2B and 2C.

Earth formations 33, 17, 18 and 19 are penetrated by the borehole 10. A cement channel 20 on one side of the cement sheath 13 of the cased well bore is illustrated allowing undesired fluid flow in a downward direction from a water sand 17 which contaminates a producing sand 19 separated from the water sand 17 by a shale layer 18. With the well logging instrument 14 placed in the position shown and with the detector source configuration illustrated in FIG. 2, the instrument 14 is capable of detecting undesired water flow from the water sand 17 through the cement channel 12 into the producing sand 19. Perforations 16 in the casing 12 allow fluid from the producing sand to enter to well borehole 10 as well as allowing the undesired water flow down the cement channel 20 to enter the borehole 10. In the configuration shown in FIG. 4, high energy neutrons from the neutron source 36 penetrate the steel casing 12 and activate the elemental oxygen in the water flow from water sand 17 through cement channel 20. The water flowing in channel 20 then continues past detectors 24 and 35 sometime later and gamma rays resulting from the decay of the radioactive nitrogen 16 are detected in the manner previously described by the detectors 34 and 35. Electrical pulses whose height is proportional to the energy of the impending gamma rays detected by the detectors 34 and 35 are transmitted to the electronic section 37 of the downhole instrument and from there coupled to the well logging cable 21 conductors and transmitted to the surface in a form which will be described in more detail subsequently.

Referring now to FIG. 4, a timing chart for the instrumentation of FIG. 20 is shown together with the pulse wave forms appearing on the logging cable 2. The electrical pulse signals representative of the energy of the gamma rays at the detectors 34 and 35 are illustrated in the top portion of the drawing of FIG. 5 while the lower portion of the drawing of FIG. 5 is a schematic representation of the timing involved in the operation of the system of FIG. 4. It will be observed as previously described, that a one millisecond duration neutron burst is initiated at time T=0 and extends through time T=0 plus one millisecond. Simultaneously with the initiation of the neutron burst in the downhole instrument, a large amplitude negative polarity synchronization (or sync) pulse is generated by the electronic section 37 of the downhole instrument and coupled to the conductors of well logging cable 21. The amplitude of the sync pulse is made greater than any possible data pulse amplitude from the detectors.

Electrical pulse signals representative of randomly occurring gamma rays impinging upon detectors D1 and D2 in the downhole instrument 14 are coupled continuously to conductors of the well logging cable 21 for transmittal to the surface by the electronic section 37 also. The pulses from detector D1 are applied to the cable conductor as negative polarity voltage pulses while pulses representative of the gamma rays detected at detector D2 are applied to the cable conductor as positive polarity voltage pulses. At the surface a pulse separator 25 is used to discriminate the detector D1 pulses from the detector D2 pulses on the basis of their electrical polarity. The negative polarity pulses are supplied as input to a synchronization pulse detector 28 and as one input to a time gate 26. The positive going pulses from detector D2 are supplied as one input to a time gate 27.

The synchronization pulse detector 28 detects the large amplitude negative sync pulses on the basis of amplitude and supplied conditioning pulses to the time gates 26 and 27 beginning at a time 4 milliseconds after the initiation of the neutron burst. Thus, there is a 3 millisecond time interval between the end of the neutron burst and the conditioning of time gates 26 and 27 by the synchronization detector and timing pulse generator circuit 28.

The output of both detectors D1 and D2 are continuously supplied to the well logging cable 21 but are thus prevented from reaching subsequent circuitry by the action of time gates 26 and 27 which allow the randomly occurring data pulses to reach the processing circuitry only during the 5.85 millisecond duration interval beginning at 4 milliseconds after T=0 and extending until 9.85 milliseconds after T=0 as illustrated in the timing chart of FIG. 5.

When time gates 26 and 27 are enabled by the conditioning pulse from sync pulses detector 28, the data pulses from the downhole detector pair D1 and D2 are coupled as inputs to pulse height analyzers 29 and 30 respectively. Pulse height analyzers 29 and 30 perform the spectral energy separation of gamma rays detected by the downhole instrument 14 at each of the detectors D1 and D2, respectively, according to the energy windows previously described. Thus the spectral degradation technique previously described may be used to derive the water's linear and volume flow ratio of water flowing behind the casing in the cement channel 20 by the method previously described. For this purpose, the energy discriminated pulse height information from pulse height analyzers 29 and 30 is supplied to a small computer 31 which may comprise a general purpose digital computer of the type PDP-11 which is manufactured by the Digital Equipment Corporation of Cambridge, Mass. Computer 31 may then, when supplied with the energy discriminated information, apply the count ratio technique described previously in order to determine the linear and volume flow rates of the water flow.

It will be appreciated by those skilled in the art that given the previously discussed relationships that such a general purpose digital computer may be programmed, for example in a commonly used programming compiler language such as FORTRAN or the like, to perform the calculations necessary to derive the water flow velocity v and volume rate $q_w$. Output signals representative of this desired information are conducted from computer 31 to a recorder 32. Recorder 32, as indicated by the broken line 23, may be electrically or mechanically coupled to a sheave wheel 22 in order to display the quantities of interest as a function of the depth of the well logging instrument in the borehole. Similarly, the count information processed by the multi-channel pulse height analyzer 29 and 30 may be conducted to the data recorder 32 and plotted or displayed as a function of the borehole depth of logging instrument 14.

While the foregoing discussions have concerned the detection of undesired fluid flow behind the casing, it is readily apparent to those skilled in the art that the instrumentation involved may be used to perform production profiling from spaced perforations within the casing. In such an instance, the downhole sonde would be set up with the neutron source located below the dual spaced detectors and stationary measurements taken at intervals between each set of perforations in a producing zone which is perforated, for example, over a long interval. As the sonde is moved downwardly past each set of perforations, the linear flow velocity and volume flow rate of the fluid within the casing may be determined very accurately since the casing cross-section F is accurately known in detail. As the oxygen activation technique of the measurement would not detect moving hydrocarbon as it flows past the instrument but would detect any undesired water cut entering from a particular set of perforations, then as the sonde is lowered past a set of perforations which is producing the undesired water cut, the volume flow rate and linear flow velocity of water entering from a particular set of perforations would be detectable by the foregoing techniques.

In this manner, the detection of undesired water stringers in a producing formation which is perforated over a long interval of production may be located. The technique for determining the linear flow rate and volume flow rate of the undesired water cut past the detectors would be the same as previously described.

It is conceivable that an undesired water cut may be produced which would flow downwardly within the casing with equal facility to that which would flow upwardly within the casing. In this case, the logging instrument may be raised to the surface, the source-detector configuration reversed, and the sequence of stationary measurements at locations between the perforations repeated while moving the sonde downwardly past each set of perforations. In this manner, undesired water cut which is produced from a given level of perforations may be detected within the casing whether it flows in a downward direction from the perforations or in an upward direction from the perforations within the casing.

The foregoing descriptions may make other alternative embodiments of the methods and apparatus of the present invention apparent to those of skill in the art. It is therefore the aim of the appended claims to cover all such changes and modifications as fall within the true spirit and scope of the invention.

What is claimed is:

1. A method for measuring the location, linear flow rate, and volume flow rate of undesired water flow behind well casing in a producing well, comprising the steps of:
    (a) locating a well tool sized and adapted for passage through a well bore and having a source of high energy neutrons at least some of which have sufficient energy to cause the nuclear reaction $O^{16}$ (n,p) $N^{16}$ and at least two gamma ray detectors spatially arranged in a predetermined manner with said source and each other in a well bore at a depth to be investigated;
    (b) irradiating the borehole environs with high energy neutrons from said source;
    (c) detecting at said detectors gamma rays resulting from the decay of the unstable isotope $N^{16}$ comprising a portion of any undesired behind casing water flow present and generating count signals representative thereof;
    (d) separating said count signals from at least one of said detectors into at least three separate energy dependent signals related to the energy of the gamma rays causing said signals and generating a ratio signal representative of the ratio of at least two separate energy dependent signals;
    (e) combining said count signals from said detectors according to a first predetermined relationship to derive an indication of the linear flow rate of undesired behind casing water flow in a preferred direction; and
    (f) generating an indication of the volume flow rate of undesired behind casing water flow from said ratio signal, the energy dependent signal not used in the generation of the ratio signal and the linear flow indication in accordance with a second predetermined relationship.

2. The method of claim 1 wherein the separating step is performed by separating said count signals from at least one of said detectors into three energy dependent signals representative of the count of gamma rays occurring in three relatively wide energy regions of the gamma ray energy spectrum, a first of said energy regions being at relatively high gamma ray energies, a second energy region being at relatively lower gamma ray energies and a third energy region including the first and second energy regions, and said ratio signal is generated from the ratio of the counts of the first energy region to the counts of the second energy region.

3. The method of claim 2 wherein said first energy region is taken to be from about 3.25 MeV to about 4.0 MeV, said second energy region is taken to be from about 4.9 MeV to about 7.2 MeV and said third energy region is taken to be from about 3.25 MeV to about 7.2 MeV.

4. The method of claim 1 and further including the steps of:
   removing the well tool from the borehole after the measurements are made at said location;
   reversing the juxtaposition of said source and said detectors;
   relocating said tool at said location with said detectors juxtaposition reversed; and
   repeating steps (b), (c), (d), (e) and (f).

5. The method of claim 1 wherein the steps are performed while moving said well tool at a known rate past the location to be investigated.

6. The method of claim 4 wherein the steps are performed while moving said well tool at a known rate past the location to be investigated.

7. A method for measuring the location, linear flow rate and volume flow rate of undesired water flow behind well casing in a producing well, comprising the steps of:
   (a) locating a well tool sized and adapted for passage through a well bore and having a pulsed source of approximately 14 MeV neutrons and at least two gamma ray detectors longitudinally spaced from said source and each other in a well bore at a depth to be investigated;
   (b) repetitively irradiating the borehole environs with bursts of fast neutrons from said source;
   (c) detecting at said detectors gamma rays resulting from the decay of the unstable isotope $N^{16}$ comprising a portion of any undesired behind casing flow present and generating count signals representative thereof;
   (d) separating said count signals from at least one of said detectors into at least three separate energy dependent signals related to the energy of gamma rays causing said signals and generating a ratio signal representative of the ratio of at least two separate energy dependent signals;
   (e) combining said count signals from said detectors according to a first predetermined relationship to derive an indication of the linear flow rate of undesired behind casing water flow in a preferred direction; and
   (f) generating from said ratio signal according to a second predetermined relationship an indication of the volume flow rate of the undesired behind casing water flow.

8. The method of claim 7 wherein the separating step is performed by separating into three energy dependent signals representative of the count of gamma rays occurring in three relatively wide energy regions of the gamma ray energy spectrum, a first of said energy regions being at relatively higher gamma ray energies, a second energy region at relatively lower gamma ray energies, and a third energy region including the first and second energy regions.

9. The method of claim 7 wherein said first energy region is taken to be from about 3.25 MeV to about 4.0 MeV, said second energy region is taken to be from about 4.9 MeV to about 7.2 MeV, and said third energy region is taken to be from about 3.25 MeV to about 7.2 MeV.

10. The method of claim 7 and further including the steps of:
    removing the well tool from the borehole after the measurements are made at said location;
    reversing the juxtaposition of said source and said detectors;
    relocating said tool at said location with said detectors juxtaposition reversed; and
    repeating steps (b), (c), (d), (e) and (f).

11. The method of claim 7 wherein the steps are performed while moving said well tool at a known rate past the location to be investigated.

12. The method of claim 10 wherein the steps are performed while moving said well tool at a known rate past the location to be investigated.

13. A method for locating and determining the linear flow rate and direction of undesired water migration behind casing in a cased well borehole producing well fluid through casing perforations, comprising the steps of:
    (a) locating a well tool having a pulsed source of high energy neutrons having sufficient energy to cause the nuclear rction $O^{16}$ (n,p) $N^{16}$ and at least two gamma ray detectors longitudinally spaced from said source and each other to a position adjacent about or below the perforations;
    (b) repetitively irradiating the borehole environs with bursts of high energy neutrons from said source;
    (c) detecting, substantially in the time between said bursts of neutrons, gamma rays primarily caused by the decay of the unstable isotope nitrogen 16 and generating signals representative thereof;
    (d) combining said signals according to a first predetermined relationship to derive an indication of the direction and linear flow rate of any elemental oxygen nuclei comprising undesired fluid flow in a preferred direction behind the well casing at said adjacent position;
    (e) separating said signal from at least one of the detectors into at least three separate energy dependent signals related to the energy of the gamma rays causing said signal and generating a ratio signal representative of the ratio of at least two of the three separate energy dependent signals; and
    (f) deriving from said ratio signal, from the indication of the linear flow rate and from the energy dependent signal not used in the generation of the ratio signal, an indication of the volume flow rate of the behind casing water migration.

14. The method of claim 13 and further including the steps of:
    removing said tool from the borehole after making the first measurement sequence adjacent above or below the perforations;
    reversing the juxtaposition of said source and said detectors;
    locating said tool in the opposite sense below or above the perforations; and
    repeating steps (b), (c), (d), (e) and (f) with said tool in the new location.

15. The method of claim 14 wherein the detecting step is performed by detecting gamma rays only in a preselected energy range in the gamma ray energy spectrum corresponding to the decay of $N^{16}$.

16. The method of claim 15 wherein said preselected energy range extends from approximately 3.25 MeV to approximately 7.20 MeV.

17. The method of claim 14 wherein said neutron bursts are of approximately 1 millisecond duration and are repeated approximately 100 times per second.

18. The method of claim 17 wherein the detecting step commences approximately 3 milliseconds after the cessation of each neutron burst.

19. The method of claim 13 wherein the detecting step is performed by detecting gamma rays only in a preselected energy range in the gamma ray energy spectrum corresponding to the decay of $N^{16}$.

20. The method of claim 19 wherein said preselected energy range extends from approximately 3.25 MeV to approximately 7.20 MeV.

* * * * *